(12) United States Patent
Destraves et al.

(10) Patent No.: US 12,005,748 B2
(45) Date of Patent: *Jun. 11, 2024

(54) TIRE HAVING A RADIOFREQUENCY TRANSPONDER

(71) Applicant: COMPAGNIE GENERALE DES ETABLISSEMENTS MICHELIN, Clermont-Ferrand (FR)

(72) Inventors: Julien Destraves, Clermont-Ferrand (FR); Pierre Guinault, Clermont-Ferrand (FR); Michel Robert, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 84 days.

This patent is subject to a terminal disclaimer.

(21) Appl. No.: 17/782,291

(22) PCT Filed: Dec. 2, 2020

(86) PCT No.: PCT/FR2020/052243
§ 371 (c)(1),
(2) Date: Jun. 3, 2022

(87) PCT Pub. No.: WO2021/111076
PCT Pub. Date: Jun. 10, 2021

(65) Prior Publication Data
US 2022/0388354 A1 Dec. 8, 2022

(30) Foreign Application Priority Data
Dec. 4, 2019 (FR) ........................ 1913729

(51) Int. Cl.
*B60C 23/04* (2006.01)
*B60C 9/04* (2006.01)
(Continued)

(52) U.S. Cl.
CPC ........... *B60C 23/0452* (2013.01); *B60C 9/04* (2013.01); *B60C 15/0628* (2013.01);
(Continued)

(58) Field of Classification Search
CPC ... B60C 23/0452; B60C 9/04; B60C 15/0628; B60C 19/082; B60C 23/0493;
(Continued)

(56) References Cited

U.S. PATENT DOCUMENTS 7,492,328 B2 * 2/2009 Kish .................... H01Q 1/2241
 73/146
9,114,671 B2 8/2015 Adamson et al.
(Continued)

FOREIGN PATENT DOCUMENTS

EP 1977912 A1 10/2008
WO 2018/104619 A1 6/2018
(Continued)

OTHER PUBLICATIONS

International Search Report dated Jan. 26, 2021, in corresponding PCT/FR2020/052243 (4 pages).

*Primary Examiner* — John A Tweel, Jr.
(74) *Attorney, Agent, or Firm* — VENABLE LLP

(57) ABSTRACT

A tire having a transponder comprises: a crown which has a crown reinforcement with an axial end at each edge, joined at each of its axial ends to a bead, which has an inner end, by a sidewall; a carcass reinforcement which is formed of adjacent first wires and is anchored in each bead around a spiral formed by second wires; the transponder comprising a core defining a first axis, a first cover wire helically wound around the core and an electrical insulation device; and the first cover wire comprising at least two conductive wire elements galvanically connected to an electronic chip comprising a radiofrequency transceiver component. The thick-
(Continued)

ness of the elastomer mixture separating the outer cover wire, which is located furthest outwards from the first axis, and the reinforcements is greater than 0.5 millimeter.

13 Claims, 8 Drawing Sheets

(51) Int. Cl.
*B60C 15/06* (2006.01)
*B60C 17/00* (2006.01)
*B60C 19/08* (2006.01)
*H01Q 1/22* (2006.01)
*H01Q 9/28* (2006.01)

(52) U.S. Cl.
CPC ........ *B60C 19/082* (2013.01); *B60C 23/0493* (2013.01); *H01Q 1/2241* (2013.01); *H01Q 9/285* (2013.01); *B60C 2017/0081* (2013.01)

(58) Field of Classification Search
CPC .......... B60C 2017/0081; H01Q 1/2241; B29D 2030/0083
See application file for complete search history.

(56) References Cited

U.S. PATENT DOCUMENTS

| | | |
|---|---|---|
| 9,490,531 B2 | 11/2016 | Robert et al. |
| 9,496,618 B2 | 11/2016 | Robert et al. |
| 10,339,435 B2 | 7/2019 | Destraves |
| 10,850,577 B2 | 12/2020 | Lallement et al. |
| 10,974,553 B2 | 4/2021 | Destraves et al. |
| 11,018,406 B2 | 5/2021 | Destraves et al. |
| 11,152,684 B2 | 10/2021 | Destraves et al. |
| 11,170,283 B2* | 11/2021 | Sams ............... G06K 19/07764 |
| 11,548,331 B2 | 1/2023 | Destraves et al. |
| 11,679,571 B2 | 6/2023 | Bestgen et al. |
| 2008/0289736 A1 | 11/2008 | Adamson et al. |
| 2020/0062050 A1 | 2/2020 | Destraves et al. |
| 2020/0079159 A1 | 3/2020 | Destraves et al. |
| 2021/0197631 A1 | 7/2021 | Fagot-Revurat et al. |
| 2021/0252815 A1 | 8/2021 | Bestgen et al. |
| 2023/0014878 A1* | 1/2023 | Destraves ................ H01Q 9/26 |

FOREIGN PATENT DOCUMENTS

| | | |
|---|---|---|
| WO | 2018/104620 A1 | 6/2018 |
| WO | 2019/175509 A1 | 9/2019 |
| WO | 2019/220063 A2 | 11/2019 |

* cited by examiner

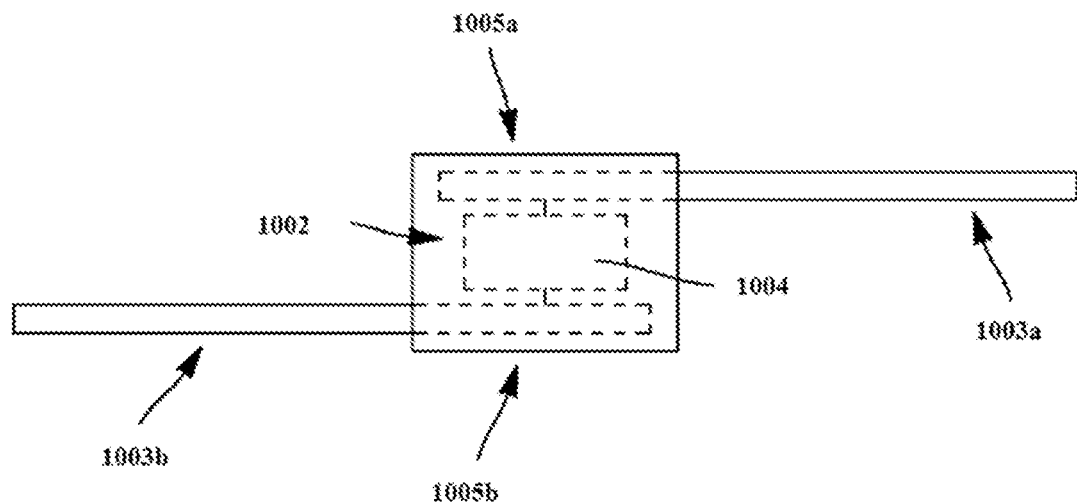
Fig. 1
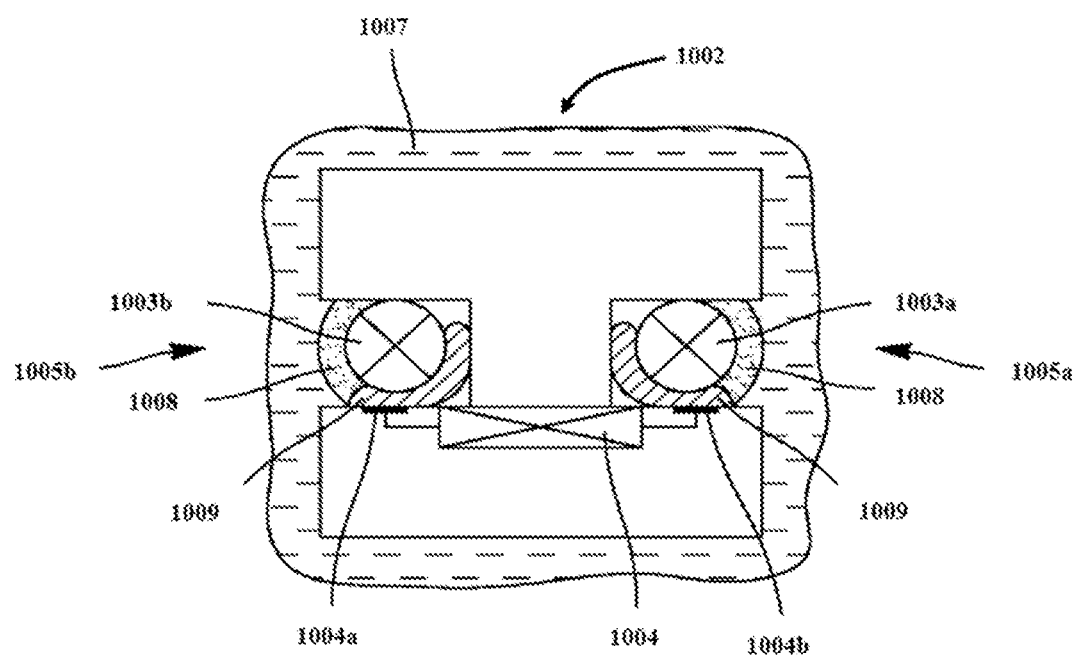
Fig. 1bis

TIRE HAVING A RADIOFREQUENCY TRANSPONDER

FIELD OF THE INVENTION

The present invention relates to a tyre casing equipped with an electronic radio identification device or radiofrequency transponder which is subjected, in particular in service, when it is mounted on a land vehicle, to high thermo-mechanical stresses.

TECHNOLOGICAL BACKGROUND

In the field of RFID (acronym for Radio Frequency Identification) devices, passive radiofrequency transponders are conventionally used for the identification, tracking and management of objects. These devices enable more reliable and faster automated management.

These passive radiofrequency identification transponders generally consist of at least one electronic chip and an antenna formed by a magnetic loop or a radiating antenna which is fixed to the object to be identified.

The communication performance of the radiofrequency transponder is expressed in terms of the maximum range of communication of the radiofrequency transponder with a radiofrequency reader, for a given signal communicated to or by the radiofrequency reader.

In the case of highly extensible products such as, for example, tyres, there is a need to identify the product throughout its life from its manufacture to its removal from the market and, in particular, during use thereof. Next, in order to facilitate this task, in particular under the conditions of use on a vehicle, a high communication performance is required, which is expressed in terms of the ability to interrogate the radiofrequency transponder at a large distance (several metres) from the product, via a radiofrequency reader. Lastly, it is desired for the manufacturing cost of such a device to be as competitive as possible.

A passive radiofrequency identification transponder formed of a wrapped wire on which is wound a conductive filamentary element connected to an electronic chip comprising a radiofrequency transmission-reception circuit is known from the prior art, in particular from WO 2019175509A1. The advantage of such a transponder lies in the simplicity of its production, which makes it inexpensive, and the miniaturization of the end product.

However, such a passive radiofrequency transponder has weaknesses in its use when it is integrated into a tyre casing. Indeed, the diameter of the conductive filamentary element is small in order to allow connection to the electronic chip which can be of the e-Tread type. However, the stresses to which a tyre casing is subjected in operation are severe, and this can jeopardize the physical integrity of such a transponder. In addition, it must also be ensured that the insertion of such a radiofrequency transponder into a tyre casing does not impair the physical integrity of the latter. Finally, the rubbery nature of the tyre casing and the diversity of elastomer compounds influence the radiocommunication performance of such a transponder.

The present invention relates to a tyre casing equipped with a passive radiofrequency transponder as described in the prior art, with the aim of obtaining a better compromise in terms of performance, and in particular improving the physical integrity of the tyre casing and that of the radiofrequency transponder during its use on a vehicle while preserving the radiocommunication performance of the radiofrequency transponder.

SUMMARY OF THE INVENTION

The invention relates to a tyre casing in the shape of a torus about a reference axis, equipped with a passive radiofrequency transponder. The tyre casing comprises:
- a crown block comprising a crown reinforcement having an axial end at each of its edges, and a tread, connected at each of its axial ends to a bead having an inner end situated axially and radially on the inside of the bead with respect to the reference axis, via a sidewall,
- first filaments going back and forth, in an adjacent arrangement and aligned circumferentially, anchored in said beads with, in each bead, loops each connecting back and forth filaments, said first filaments forming at least a circumferential alignment defining a carcass reinforcement separating the tyre casing into two regions, inner and outer, with respect to the carcass reinforcement,
- in each bead, means for anchoring said first filaments, comprising second filaments oriented circumferentially axially bordering the first filaments, and forming at least one spiral,
- a first layer of elastomer compound forming the exterior surface of the tyre casing in the region of the bead, said first layer of elastomer compound being intended to come into contact with the rim,
- a second layer of elastomer compound situated radially on the outside in contact with the first layer of elastomer compound forming the exterior surface of said sidewall,
- the passive radiofrequency transponder comprising a main core defining a first longitudinal axis and being electrically insulating, a first primary cover filament wound in turns around the main core defining a winding diameter D and an electrical insulation device disposed radially on the outside of the first primary cover filament with respect to the first longitudinal axis,
- the first primary cover filament comprising at least two conductive filamentary elements, the diameter of which is between 0.05 and 0.15 millimetre, galvanically connected to at least one electronic chip comprising a radiofrequency transmission-reception component,
- the main core having a stiffness lower than the maximum stiffness of the first primary cover filament.

The tyre casing is characterized in that the electrical insulation device has a mean relative dielectric permittivity less than or equal to 10, preferably less than 5, over a thickness greater than or equal to one-sixth of the winding diameter D of the first primary cover filament, in that the dipole radiating antenna is located in line with at least two first filaments of the carcass reinforcement, in that the passive radiofrequency transponder is located axially on the outside of the inner end of the bead and radially between the radially outermost end of the at least one spiral and the axial end of the crown reinforcement, preferably on the inside of the tyre casing and in that the thickness of elastomer compound separating the outer cover filament of the passive radiofrequency transponder, located radially outermost with respect to the first longitudinal axis, and the filaments defining the carcass reinforcement of the tyre casing is greater than 0.5 millimetre, preferably greater than 1.0 millimetre.

Advantageously, the outer cover filament of the passive radiofrequency transponder is covered with an adhesion promoter promoting adhesion between the outer cover filament and the elastomer compounds adjacent to the outer cover filament.

Here, the term "elastomer" is understood to mean all elastomers including TPEs (acronym for ThermoPlastic Elastomers), such as for example diene polymers, i.e. polymers comprising diene units, silicones, polyurethanes and polyolefins.

Here, the term "conductive filamentary element" means that the element has a main dimension along its length relative to the other three-dimensional dimensions of the element, that is to say at least a factor of 10. In addition, this element is conductive, that is to say it conducts electrical charges along the main dimension. It may for example be a filament that is entirely metal or covered on its external surface with a metal material such as copper, zinc, brass, silver or gold. These conductive filamentary elements may be a single-filament component, just as they may equally be a multiple-filament component. It can contribute to implementing the functions of the chip, in particular supplying the chip with energy and/or forming a radiofrequency antenna.

Here, the term "chip" means any integrated electronic component implementing one or more functions including at least one radiofrequency transmission-reception system. A "chip" can thus form a sensor, have a data processing capability, a memory.

Here, the term "passive radiofrequency transponder" means that the electronic system emits a signal in response to a signal received without its own energy input to emit this response, that is to say that the emission energy for emitting the response is provided by the interrogating signal to the electronic system.

The term "located in line with two first filaments" means that the orthogonal projection of the element, in this case the radiating dipole antenna, onto the plane defined by two parallel first filaments of the carcass reinforcement intersects these two first filaments when the tyre casing is in the green tyre state.

Lastly, the fact that the characteristic dimension of the radiating dipole antenna defined by the first longitudinal axis is located in line with a plurality of first filaments of the carcass reinforcement ensures that the position of the passive radiofrequency transponder in the thickness of the tyre casing is controlled, in particular when the tyre casing is in the green tyre state. To be specific, this configuration reduces any possible movement of the radiating dipole antenna within the various non-crosslinked layers, in particular with respect to the carcass reinforcement, when the tyre casing is being built up in the green state. Because the carcass reinforcement of the tyre casing runs from one bead wire to the other, this provides a wide region in which the passive radiofrequency transponder can be fitted, and be operational, in the tyre casing. Specifically, the quantity of elastomeric material surrounding the passive radiofrequency transponder is thus controlled, so that the length of the radiating dipole antenna can be tuned to the electrical environment of the radiating dipole antenna within the tyre reliably and robustly.

The passive radiofrequency transponder is designed so that it operates in the far field via a radiating dipole antenna to promote communication range. This radiating dipole antenna comprises the two conductive filamentary elements of the first primary cover filament. This radiating dipole antenna is in the form of a helix, which makes it possible to easily withstand the high thermo-mechanical stresses that are encountered within a tyre casing, in particular in service. This helical winding is facilitated by the presence of the main core which serves as a guide for the helix. It is the volume occupied by the main core that is important for the helical winding of the conductive filamentary elements. In addition, the flexibility of the main core makes it possible for the radiofrequency transponder not to be made too stiff, which limits the forces passing through the conductive filamentary elements. To be specific, the presence of the main core offers a new pathway for the forces passing through the radiofrequency transponder, in particular under high stresses, which limits the forces passing through the conductive filamentary elements, in particular at the galvanic connections with the electronic chip. The choice of low stiffness, relative to the stiffness of the conductive filamentary elements, ensures that the forces generated by the deformation of the main core are limited with respect to a highly stiff core for the same degree of deformation of the main core. Thus, the amount of force passed on from the main core to the conductive filamentary elements is limited and these conductive filamentary elements are encouraged to deform, their helical winding minimizing the stresses on account of the geometric shape. As a result, the synergy between the mechanical properties of the main core, the helical winding of the conductive filamentary elements and the diameter thereof guarantees that the forces passing through the conductive filamentary elements, in particular at the galvanic connections with the chip, are limited, thereby ensuring the endurance of the assembly in a highly stressed environment such as a tyre. Greater stiffness would have required the use of a larger diameter of filament for the conductive filamentary element and/or would have required opting for a material with a higher endurance limit. This increased endurance of the radiofrequency transponder allows it to be positioned in the most highly stressed areas of the tyres, which is not permitted for conventional radiofrequency transponder designs where the radiofrequency antenna is galvanically connected to the chip. In addition, a smaller conductive filamentary element diameter, of between 50 and 150 micrometers, guarantees a better quality galvanic connection of the conductive filamentary element to the electronic chip, which further reinforces its endurance. It is also guaranteed that the resistance of the losses will be low in the conductive filamentary element, thus improving the radioelectric performance of the radiofrequency antenna. However, it is necessary for the conductive filamentary element to maintain a certain mechanical strength in order to withstand the thermo-mechanical stresses that it will experience in a highly stressed environment such as a tyre casing, without optimizing the breaking limit of the material of these filamentary elements, which are generally made of mild steel. This embodiment makes it possible to have a differentiating technical-economic-industrial solution for radiofrequency transponders with galvanic connection between the radiofrequency antenna and the electronic chip. Since the conduction of the electromagnetic signal takes place by skin effect, the reduction in the diameter of the conductive filamentary element, in the aforementioned range, slightly modifies the radioelectric performance of the dipole antenna thus constituted. The main core must be of closed, solid or hollow section and be electrically insulating in order to guide the formation of the spring and to avoid impairing the radiocommunication performance of the radiating dipole antenna. This assembly contributes to the physical integrity of the passive radiofrequency transponder within the tyre casing. Finally, since the chip is equipped with a radiofrequency transmission-reception circuit, the assembly constitutes a passive radiofrequency transponder.

Here, the term "extensible core" means that the core has a high elongation and elastic return capacity, exceeding 5%, typically exceeding 50% or 100% of its length at rest. It may for example be a core of natural or synthetic rubber such as polyurethane or elastane.

Generally, a dipole radiating antenna defining a first longitudinal axis is created with the aid of two conductive filamentary elements connected to the electronic chip and which extend away from the latter in two opposite directions from each other. Thus, a half-wave dipole antenna is produced which has the advantage of being an omnidirectional antenna in transmission and reception allowing it to be freed from constraints on the positioning of the radiating antenna within the tyre casing so as to optimize the field of radiofrequency communication. This makes the communication performance of the passive radiofrequency transponder robust. The first primary cover filament comprising these conductive filamentary elements is helically wound around the primary core to maintain a rectilinear orientation of said half-wave dipole antenna. Next, the half-wave dipole radiating antenna and the chip are embedded within an electrical insulation device. This electrical insulation minimizes the electrical losses and therefore improves the communication performance of the radiofrequency transponder both in transmission and in reception. The quality of electrical insulation is evaluated through a characteristic, the relative dielectric permittivity of the medium formed by the electrical insulation device. This relative dielectric permittivity must be at least less than 10 in order to have radiocommunication performance, and preferably less than 5 in order to have an improved range from which the passive radiofrequency transponder can be read when this transponder is placed in the architecture of the tyre casing in the sidewall or the bead. In addition, the first primary cover filament comprising the half-wave dipole radiating antenna needs to be covered to a thickness of about one-sixth of the winding diameter D of the helix. Below this threshold, the radiofrequency communication performance cannot be satisfactorily guaranteed for a passive radiofrequency transponder incorporated within the tyre casing.

And for the physical integrity of the radiofrequency transponder and/or that of the tyre casing, it is necessary to guarantee the presence of a sufficient quantity of elastomer compound between the outer cover filament and the reinforcing elements of the tyre casing. Generally, these components are of a non-elastomeric nature, and contact between these components can cause one or the other or both components to break under cyclic stresses during the life cycle of the tyre casing. In instances in which the break occurs at the level of the cover filament of the transponder, such as for example the first primary cover filament, this may deteriorate the radiofrequency operation of the transponder. In the event of deterioration of the reinforcing elements, for example at the level of the carcass reinforcement layer, this can generate a mechanical imbalance of the carcass reinforcement leading to an accelerated deterioration of the latter and therefore of the tyre casing. A thickness of 0.5 millimetre is the minimum necessary for the least stressed areas in which the radiofrequency transponder is fitted in the tyre casing. A thickness of at least one millimetre between these components ensures improved physical integrity of the two components no matter where the passive radiofrequency transponder is fitted in the sidewall or the bead of the tyre casing.

Finally, the radiofrequency transponder is situated in the bead and sidewall region of the tyre casing, notably between the spiral and the crown reinforcement of the crown block, so as to facilitate communication between it and an external radiofrequency reader notably in operation on the vehicle. Specifically, because the elements of the bodywork of the vehicle which are generally made of metal, such as the wing or the wheel, block the propagation of radioelectric waves to or from the passive radiofrequency transponder situated with the tyre casing, notably in the UHF frequency range, fitting the passive radiofrequency transponder in the sidewall and bead region, radially on the outside of the spiral of the tyre casing, makes it easier for the passive radiofrequency transponder to be interrogated and read by an external radiofrequency reader from a long distance in numerous positions of the external radiofrequency reader when the tyre casing is in service on a vehicle. Communication with the passive radiofrequency transponder is therefore robust and reliable. Although not essential for radiofrequency communication, the passive radiofrequency transponder is situated on the inside of the tyre casing. It is thus incorporated into this casing during the manufacture of the tyre casing, thereby safeguarding the read-only data contained in the memory of the electronic chip of the passive radiofrequency transponder such as, for example, the tyre casing identifier. The alternative is to use techniques known in the prior art to affix a patch made from an elastomer compound containing said passive radiofrequency transponder to the external surfaces of the tyre casing such as, for example, to the inner liner layer or to the sidewall. This operation may be performed at any time during the course of the life of the tyre casing, making the tyre casing data contained in the memory of the electronic chip of the passive radiofrequency transponder less reliable.

Optionally for the physical integrity of the tyre, it is also advantageous to guarantee cohesion between the components of the radiofrequency transponder which do not adhere to the elastomer compound and are located radially outermost with respect to the first longitudinal axis and the elastomer compounds adjacent to these components, whether they are inside the radiofrequency transponder or form part of the architecture of the tyre casing. Generally, the cover filaments are metal and/or textile and the main core is textile. The cover filaments are potentially components that do not adhere to the elastomer compounds. The electronic chip and its direct components are radially on the inside of at least the first primary cover filament and thus are not included in these non-adherent components. This cohesion reduces the risk of cracks starting and propagating at the interface defined by these different environments.

According to one specific embodiment, the tyre casing comprises at least a third layer of elastomer compound situated axially on the outside of the carcass reinforcement and axially on the inside of the first and/or second layer of elastomer compound.

Thus, this configuration of tyre casing provides a compromise in the performance of the bead and the sidewall that are differentiating and the passive radiofrequency transponder can be inserted in contact with this third layer of elastomer compound.

According to another specific embodiment, with the tyre casing comprising an airtight layer made of elastomeric material, i.e. a layer highly impermeable to air, located furthest on the inside of the tyre casing with respect to the reference axis, the tyre casing comprises a fourth layer of elastomer compound located on the inside of the carcass reinforcement.

This configuration of tyre casing particularly allows extended running thanks to the fourth layer of elastomer compound which is situated in the region of the sidewall of the tyre casing. In the event of the tyre casing suffering a loss of inflation pressure, the fourth layer of elastomer compound allows the transmission of load between the bead and the crown block without causing the sidewall of the tyre casing to buckle.

The passive radiofrequency transponder may therefore be in contact with this fourth layer of compound.

According to one particular embodiment, the tyre casing comprises at least third reinforcing filaments in an adjacent arrangement so as to constitute a reinforcing structure.

These are special-purpose casings which, depending on the type of use or in-service stress loadings, require localized reinforcing structures in the bead, for example, to prevent friction between the wheel and the tyre casing. This reinforcing structure may also be located in a certain region, particularly the axial ends of the crown block, to constrain the geometry of the crown block and of the tyre casing under severe thermo-mechanical stress loadings. This reinforcing structure generally has at least one free end. The radiofrequency transponder may then be in contact with or close to the free end of this reinforcing structure.

According to one specific embodiment, the first primary cover filament comprising a non-extensible tertiary core, arranged collinearly with the at least two conductive filamentary elements and with the at least one electronic chip, and at least one tertiary cover filament wound in turns around the tertiary core, the at least two conductive filamentary elements and the at least one electronic chip, the tertiary core has a stiffness greater than the maximum stiffness of each conductive filamentary element.

This embodiment makes it possible to stiffen the first primary cover filament, thereby facilitating handling thereof, in particular helical winding thereof around the main core. In order to preserve the alignment of the conductive filamentary elements while they are being helically wound, they are first reinforced with a tertiary core that is stiffer than the conductive filamentary elements on which they are supported. Thus, when handling the first primary cover filament, it is possible to stress this tertiary core instead of stressing just the conductive filamentary elements. The forces passing through the conductive filamentary elements are thus reduced, making them, and the galvanic connection between these conductive filamentary elements and the electronic chip, stronger. This embodiment improves the physical integrity of the passive radiofrequency transponder. The tertiary core may be a two-dimensional or three-dimensional element which is electrically insulating so as not to impair the radioelectric operation of the electronic part of the passive radiofrequency transponder.

Advantageously, with one of the conductive filamentary elements being galvanically connected to an end of a third conductive filamentary element the other end of which is galvanically connected to the electronic chip in order to form a loop, the parts of the conductive filamentary elements forming the loop and the at least one electronic chip are electrically insulated.

The loop thus formed constitutes an impedance-matching circuit located between the electronic chip and the half-wave dipole antenna made up of two strands. The first strand is defined by the conductive filamentary element which is directly connected to the electronic chip while the other strand consists of the part of the other conductive filamentary element extending beyond the loop. The galvanic connection between part of one of the two conductive filamentary elements and the third conductive filamentary element may be produced by means of an electronic chip, making it possible to use for example e-Tread technology between the various conductive filamentary elements and the chip. The impedance matching depends both on the curvilinear length of the loop and on the diameter of the conductive filamentary elements forming the loop. This impedance matching makes it possible to optimize the radiofrequency performance of the radiofrequency transponder at the inherent communication frequency thereof while limiting energy losses. The electrical insulation of this impedance-matching circuit makes it possible to limit interference from the electrical environment external to the radiofrequency transponder. Thus, the impedance matching is satisfactory regardless of the position of the radiofrequency transponder within the architecture of the tyre. Moreover, this electrical insulation can be achieved by means of glob tops, by placing an epoxy resin on the components, which protects them and their connections both mechanically and chemically.

Very advantageously, the electronic chip and the conductive filamentary elements delimiting the loop are encapsulated in a rigid electrically insulating body.

This makes it possible to guarantee the geometry of the loop, which sets the electrical impedance of the electronic system made up of the electronic chip and the loop. In particular, the helical winding of the first primary cover filament does not deform the geometry of the assembly and guarantees the output impedance at the terminals of the half-wave dipole antenna.

According to a specific embodiment, the device for electrical insulation of the passive radiofrequency transponder comprises at least one secondary cover filament wound in turns around a secondary core, the main core and the first primary cover filament, the secondary core being collinear with the main core.

This is a clever way of forming the electrical insulation device through a wrapping process similar to that which could be used for the first part of the passive radiofrequency transponder in which the wire comprising the secondary core, the main core and the first primary cover filament is wrapped by the secondary cover filament. Of course, in this case the materials of the secondary core and the secondary cover filament are chosen from electrically insulating materials in order to comply with the mean dielectric permittivity level of the electrical insulation device. Similarly, the thickness of the electrical insulation device is defined by the dimensions of the secondary core, the diameter of the secondary cover filament and the winding in turns of the latter defined by the number of layers and the pitch between the turns. There is a thickness of the electrical insulation device from which stability of the electrical environment in which the passive radiofrequency transponder is located is guaranteed when the latter is incorporated into the architecture of a tyre casing. This threshold thickness is around 2 to 5 millimetres beyond the cylinder circumscribed to the first primary cover filament for passive radiofrequency transponders operating in the frequency band between 800 and 960 MHz. This threshold thickness makes it possible to make the subject matter of the invention robust in terms of radiofrequency performance by ensuring a constant environment for the radioelectric waves received or radiated by the passive radiofrequency transponder. This makes it possible to robustly fix the dimension of the half-wave radiating dipole antenna for operation at the targeted communication frequency. Of course, this thickness of electrical insulation around the passive radiofrequency transponder can also be obtained by other electrical insulation device structures such as for example a mass of electrically insulating elastomer compound having a dielectric permittivity of less than 10, preferably less than 5. The term "electrically insulating" is understood here to mean that the electrical conductivity of the elastomer compound is at least below the conductive charge percolation threshold of the compound. The collinearity of the main and secondary cores ensures a homogeneous distribution of the electrical insulation around the radiating dipole antenna. Ideally, the two cores are coaxial, which requires that the secondary core be of closed or quasi-closed hollow section to allow the insertion of the main core and the half-wave dipole antenna inside.

Generally, a textile, for example nylon, secondary cover filament or secondary core should be used, for example. In this case, the outer cover filament becomes the secondary cover filament which must be covered with an adhesion promoter compatible with the elastomer compounds adjacent to this secondary cover filament.

Advantageously, the stiffness of the secondary core is at most equal to the stiffness of the main core.

This also makes it possible not to stiffen the radiofrequency transponder. Thus, the thermo-mechanical stresses exerted on the radiofrequency transponder are distributed between the two cores, which makes it possible to reduce those passing through the main core. Thus, the physical integrity of the radiating dipole antenna and of the galvanic connections between the electronic chip and the conductive filamentary elements is improved, even when the radiofrequency transponder is fitted in a highly stressed area of the tyre casing.

According to a first preferred embodiment, the passive radiofrequency transponder is situated in contact with a layer of elastomer compound of the tyre casing.

This is an embodiment which makes the passive radiofrequency transponder easier to fit in the architecture of the tyre casing. The passive radiofrequency transponder is fitted directly in the means for building the green tyre by placing said radiofrequency transponder on the elastomer compound. The passive radiofrequency transponder will then be covered with a second layer of elastomer compound. In this way, the passive radiofrequency transponder is therefore fully encapsulated by the components of the tyre casing. It is therefore embedded within the tyre casing, ensuring that it cannot be falsified when the memory of the electronic chip is write protected. The alternative is to place the passive radiofrequency transponder directly on the filaments, which can be detrimental if the filaments are made of metal. It would be preferable, if the option of fitting directly on the filaments is chosen, that the passive radiofrequency transponder be coated beforehand with an electrically insulating elastomer compound. Preferably, the assembly will be covered by another layer of elastomer compound. As a result, the passive radiofrequency transponder will still be in contact with a layer of elastomer compound.

Preferentially, the passive radiofrequency transponder is situated at a distance of at least 5 millimetres from the ends of a carcass reinforcement of the tyre casing.

The passive radiofrequency transponder presents as a foreign body in the architecture of the tyre constituting a mechanical singularity. The ends of the reinforcements also constitute mechanical singularities. To safeguard the endurance of the tyre casing, it is preferable for the two singularities to be distanced from one another by a certain distance. The greater this distance, the more favorable it is. The minimum distance of the influence of a singularity is of course proportional to the dimension and the nature of this singularity. The singularity constituted by the end of a reinforcing structure is all the more sensitive the higher the stiffness of the adjacent elastomer compounds compared to the stiffness of the reinforcing structure. When the reinforcers are made of metal or of textile with a stiffness as high as in the case of aramid, for example, it is appropriate to keep the two singularities at least 10 millimetres apart.

Very preferentially, with the orientation of the first filaments defining a direction of reinforcement, the first longitudinal axis of the radiating dipole antenna is perpendicular to the direction of reinforcement.

This is a particular embodiment making it possible to better distribute the forces passing between the passive radiofrequency transponder and the tyre casing during the manufacture of the tyre casing or during the use of the tyre casing. In addition, this orientation is firmly determined during the manufacture of the tyre casing since this direction serves as a guide for the manufacture of the tyre casing, which facilitates the fitting of the passive radiofrequency transponder in the tyre casing in the green tyre state.

According to one specific embodiment, the radioelectric communication with the radiofrequency reader occurs in the UHF band and most specifically in the range comprised between 860 and 960 MHz.

Specifically, in this frequency band, the length of the radiating dipole antenna is inversely proportional to the communication frequency. Furthermore, outside of this frequency band, radioelectric communication is highly impaired or even impossible, through standard elastomeric materials. Thus, this is the best compromise between the size of the radiofrequency transponder sized according to the length of the dipole antenna and its radioelectric communication, in particular in the far field, making it possible to have communication ranges that are satisfactory for the tyre industry.

According to another particular embodiment, the length L of the helical winding of the first primary cover filament of the passive radiofrequency transponder along the first main axis is between 30 and 80 millimetres.

Specifically, in the frequency range between 860 and 960 MHz and depending on the relative dielectric permittivities of the elastomer compounds surrounding the radiofrequency transponder, the total length of the helical spring, which is tailored to the half-wavelength of the radioelectric waves transmitted or received by the radiofrequency transponder, is located in the interval between 30 and 80 millimetres, and preferably between 35 and 70 millimetres. In order to optimize the operation of the radiating antenna at these wavelengths, the length of the half-wave dipole antenna should be perfectly tailored to the wavelength. The length of the electronic chip and possibly that of the loop used for impedance-matching of the assembly must also be taken into account.

Advantageously, the winding diameter D of the helical spring is between 0.6 and 2.0 millimetres, and preferably between 0.6 and 1.6 millimetres.

This allows the volume taken up by the half-wave dipole antenna to be limited and therefore the thickness of the electrically insulating device around the radiofrequency transponder to be increased. Of course, this diameter of the helical spring may be constant, variable, continually variable or piecewise variable. It is preferable from the point of view of the mechanical integrity of the radiating antenna for the diameter to be constant or continuously variable.

According to one advantageous embodiment, the pitch of the helix of the radiating antenna is between 1.0 and 4.0 millimetres, preferably between 1.0 and 2.0 millimetres.

This makes it possible to ensure that the ratio of the helix pitch to the winding diameter of the spring, or at least one loop, in the first region of the radiating antenna, is between 0.8 and 3, guaranteeing a minimum of elongation of the helical spring, while ensuring radioelectric performance is satisfactory both as regards transmission and reception. In addition, this pitch may also be constant or variable throughout the radiating antenna. Of course, it is preferable for the pitch to be continuously variable or variable with slight variations in transition in order to avoid singular points in the radiating antenna that would constitute mechanical weaknesses in the radiating antenna.

According to one advantageous embodiment, the diameter of the conductive filamentary elements is between 0.08 and 0.11 millimetre.

In this range, loss resistance is certain to be low, thus improving the radioelectric performance of the radiating antenna. Moreover, these diameter sizes allow the conductive filamentary element to be attached to an electronic chip using e-tread technology. However, it is necessary for the wire to retain a certain mechanical strength in order to be able to bear the thermo-mechanical stresses that it will undergo in a highly stressed environment such as a tyre casing, without optimizing the breaking stress of the material of these wires, which is generally mild steel. This makes it possible to ensure the radiating antenna represents a satisfactory technical/economical compromise.

BRIEF DESCRIPTION OF THE DRAWINGS

The invention will be better understood by means of the following detailed description. These applications are given solely by way of example and with reference to the appended figures, throughout which the same reference numerals denote identical parts, and in which:

FIG. 1 shows a diagram of the electronic part of a radiofrequency transponder according to the invention;

FIG. 1bis is a sectional view of the electronic part of the radiofrequency transponder of FIG. 1 at the electronic chip;

DETAILED DESCRIPTION OF EMBODIMENTS

Below, the terms "tyre" and "pneumatic tyre" are employed equivalently and refer to any type of pneumatic or non-pneumatic tyre.

In FIG. 1, a chip 1002 is connected to two conductive filamentary elements 1003a and 1003b which define the first longitudinal axis of the passive radiofrequency transponder. To this end, the chip 1002 comprises two grooves 1005a and 1005b into which are respectively inserted conductive filamentary elements 1003a and 1003b which each extend from a side of the chip 1002 to form a half-wave dipole antenna. The chip 1002 also includes a radiofrequency transmission-reception component 1004.

FIG. 1b is shows a detailed sectional view of the electronic part of the passive radiofrequency transponder of FIG. 1. The chip 1002 includes a radiofrequency transmission-reception component 1004. The conductive filamentary elements 1003a and 1003b are connected to radiofrequency transmission-reception component 1004 via connection terminals 1004a and 1004b, respectively, arranged in the grooves 1005a and 1005b, respectively. The galvanic connection can be fostered by means of a solder or a braze 1009. To make the galvanic connection robust at the grooves 1005a and 1005b, it is possible to deposit an adhesive 1008 in the grooves 1005a and 1005b and on the parts of the conductive filamentary elements 1003a and 1003b at these grooves 1005a and 1005b. It is also possible to encapsulate the chip 1002 with a protective material 1007, such as an epoxy-type resin for example, to protect this chip 1002 both mechanically and chemically.

Figure 2:
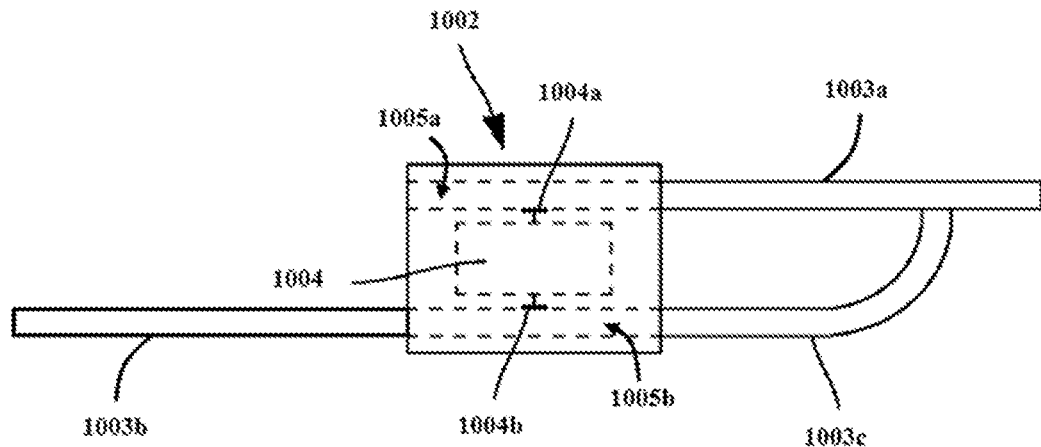
FIG. 2 shows a diagram of the electronic part of the radiofrequency transponder according to the invention according to a second embodiment.

FIG. 2 shows the electronic part of a passive radiofrequency transponder according to the invention in a second optional embodiment in which the chip 1002 is connected to a closed loop in order to match the impedance of the half-wave dipole antenna formed by the conductive filamentary elements 1003a and 1003b to that of the electronic chip 1002. This loop is obtained by connecting to one another a portion of a conductive filamentary element, in this example the element 1003a, and a third conductive filamentary element 1003c. The other end of the third conductive filamentary element 1003c is connected to the chip 1002 at the groove 1005b. In fact, industrially, it is possible to use a single conductive filamentary element 1003b of larger dimension so that it has a sufficient length to constitute both an antenna strand a quarter wavelength in length and the filamentary element 1003c. In addition, it is also possible to use an electrical connection chip 1002bis (not shown) in order to galvanically connect the first end of the third filamentary element 1003c to the conductive filamentary element 1003a. In this context, the length of the second conductive filamentary element 1003a comprises, on the one hand, an antenna strand a quarter wavelength in length and part of the loop between the two chips 1002 and 1002bis. This clever technique makes the industrial manufacture of the electronic part of the passive radiofrequency transponder robust and productive. The closed loop in this case consisting of a part of the conductive filamentary element 1003a between the chips 1002 and 1002bis, the filamentary element 1003c and the second connection chip 1002bis, being adjusted to match the electrical impedance of the half-wave dipole antenna formed by the conductive filamentary element 1003b and the other part of the conductive filamentary element 1003a to that of the electronic chip 1002. The electronic chip 1002 and the closed loop are covered with an electrically insulating protective material such as an epoxy type resin for example, making it possible to protect the loop mechanically and chemically while ensuring stability of the electrical environment of the system. This protection ensures operating stability of the closed loop and may consist of the superposition of a resin providing mechanical and chemical protection and a second insulating resin such as DELO AD 465.

Figure 3:
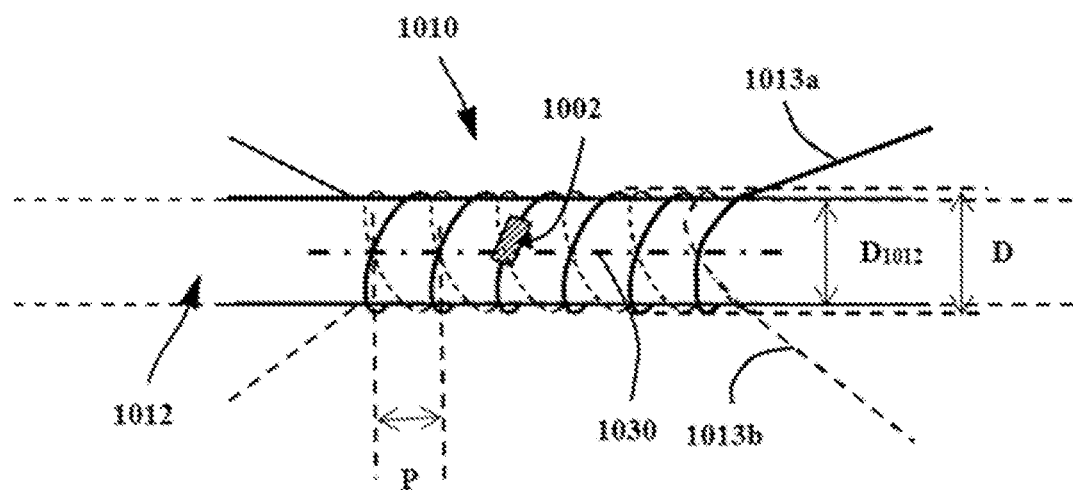
FIG. 3 shows an example of helical winding of the electronic part of the radiofrequency transponder according to the invention.

FIG. 3 shows the helical winding 1010 of the electronic part of the passive radiofrequency transponder according to the first embodiment. First of all, a main core 1012 is formed, and this may be an extensible filament made of natural or synthetic rubber such as polyurethane or elastane, or a non-extensible filament with a diameter D1012 of less than 2 millimetres. In this example, it is a 940 HT polyacrylate filament which is nylon with a solid diameter of 0.5 millimetres. This main core 1012 is encircled by a first primary cover filament 1013a and, in this example, a second primary cover filament 1013b. This primary cover filament 1013a includes the electronic part of the passive radiofrequency transponder. This electronic part comprises at least the conductive filamentary elements 1003a, 1003b, and the electronic chip 1002. The conductive filamentary elements 1003a and 1003b are in this case metal, multi-filament or single-strand wires with a diameter of less than 0.15 millimetre, preferably less than 0.11 millimetres. In this case it is a steel single-filament wire covered with a brass layer which allows the conduction of electrical charges on the surface and which can be soldered to the electronic chip 1002 by means of a braze in the case of the e-tread method. The winding of the first primary cover filament 1013a is produced by wrapping the first primary cover filament 1013a around the main core 1012 making it possible to obtain a winding diameter D of the first primary cover filament 1013a of between 0.5 millimetre and 1.0 millimetre with a helix pitch varying from 0.8 to 3 millimetres. Thus, a half-wave dipole antenna is formed, the axis of the helix of which represents the first longitudinal axis 1030 of the passive radiofrequency transponder. Naturally, other methods of helically winding the primary cover filament 1013a may also be used to helically wind the electronic part of the passive radiofrequency transponder, such as twisting for example. A second primary cover filament 1013b is helically wound around the main core 1012 and the first primary cover filament 1013a. Its function is to make the assembly formed by the main core 1012 and the primary cover filament 1013a comprising the electronic part of the passive radiofrequency transponder mechanically integral. Thus, the geometry of the helical winding 1010 of the first primary cover filament 1013a is preserved. The winding of this second primary cover filament 1013b, which is generally a textile filament, is preferentially the opposite of the first primary cover filament 1013a, so as to balance the stresses, in particular torsional stresses, that they can generate in the system thus designed. The second primary cover filament 1013b is optional in our case since the conductive filamentary element 1013a is here made of steel which, due to its helical winding, will deform plastically. Thus, the geometry of the helical winding 1010 of the first primary cover filament 1013a is fixed by this plasticity of material.

Figure 4:
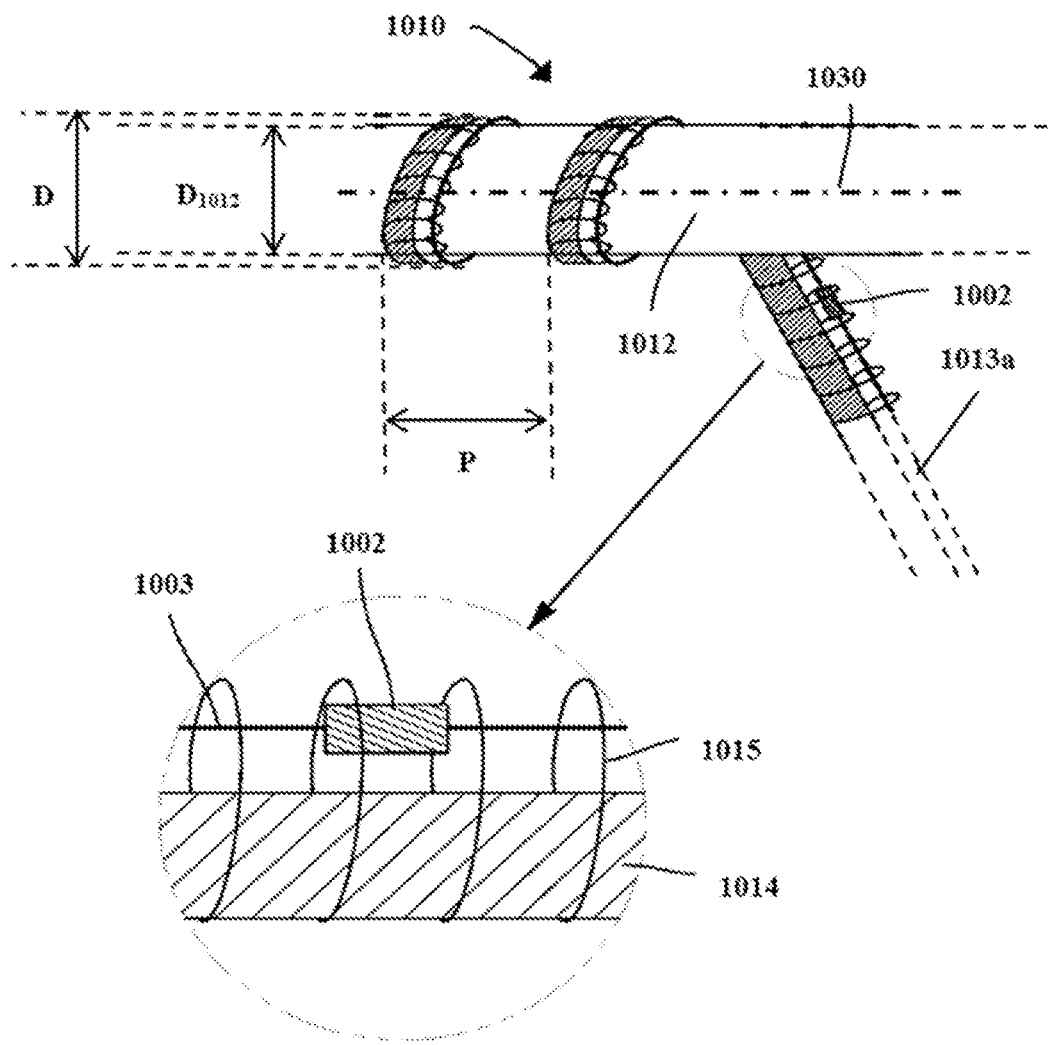
FIG. 4 shows an example of helical winding according to another embodiment of the electronic part of the radiofrequency transponder according to the invention.

FIG. 4 shows helical winding 1010 of the electronic part of the passive radiofrequency transponder according to a preferred embodiment. This time, before the first primary cover filament 1013a is helically wound, it is reinforced by means of a tertiary core 1014. To be specific, during a step in preparation for helical winding, the electronic part of the passive radiofrequency transponder is combined with a tertiary core 1014 in order to reduce the thermo-mechanical stresses passing through the conductive filamentary elements 1003a and 1003b, in particular in the areas where they are connected to the electronic chip 1002. To this end, the electronic part is arranged collinearly with a tertiary core 1014 to which it is integral. This integral connection is in this case produced by means of a textile tertiary cover filament 1015 helically wound around the tertiary core 1014 and the electronic part of the passive radiofrequency transponder. Naturally, it is possible to balance out the stresses of this primary cover filament 1013a by means of a second tertiary cover filament wound in the opposite direction to the first tertiary cover filament 1015. Moreover, this double winding guarantees better cohesion between the tertiary core 1014 and the electronic part of the radiofrequency transponder. The presence of this tertiary core 1014 ensures a reduction in the stresses present in the conductive filamentary elements 1003a and 1003b of the electronic part by multiplying the paths that the forces can take. It also makes handling of the primary cover filament 1013a robust, in particular handling by automatons, which improves the productivity of the helical winding of the electronic part of the passive radiofrequency transponder. Necessarily, the tertiary core 1014 is electrically insulating so as not to impair the operation of the electronic part of the passive radiofrequency transponder. It is preferable that the tertiary core 1014 be inextensible and stiffer than the conductive filamentary elements 1003a and 1003b in order to reduce the deformations and stresses in the conductive filamentary elements 1003a and 1003b and to guarantee geometric stability for the helical winding 1010 of the electronic part of the passive radiofrequency transponder.

The helical winding of the electronic part of the passive radiofrequency transponder defines a first longitudinal axis 1030, a winding diameter D which is necessarily greater than or equal to the diameter of the circumscribed circle of the main core 1012 and a helix pitch P. Adjustment of these last two parameters of the helical winding makes it possible both to guarantee a deformation capacity of the helix 1010 minimizing the forces passing through the primary cover filament 1013a and to match the impedance of the half-wave dipole antenna formed by the conductive filamentary elements 1003 to that of the electronic chip 1002, which makes it possible to optimize the radiofrequency communication of the passive radiofrequency transponder.

Figure 5:
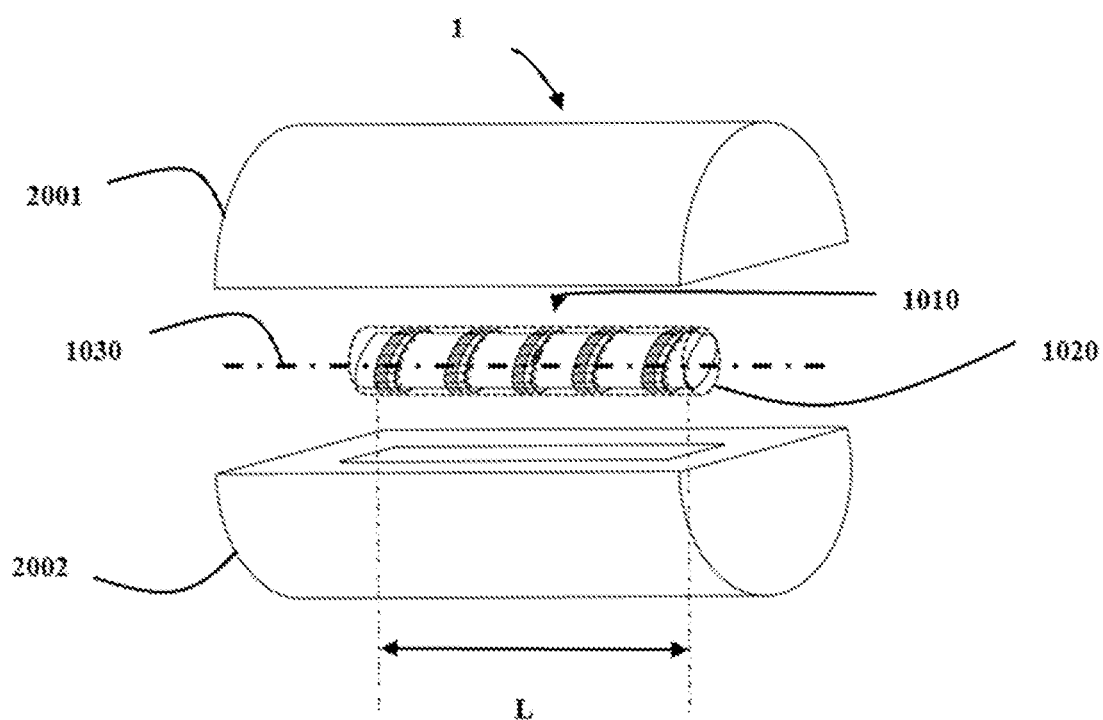
FIG. 5 is an exploded view of a passive radiofrequency transponder in a first embodiment of the electrical insulation device according to the invention.

FIG. 5 is an exploded perspective view of a passive radiofrequency transponder 1 according to a first embodiment. This radiofrequency transponder 1 is in the form of a first sub-assembly 1010 encased in an electrical insulation device. The sub-assembly 1010, corresponding to the helical winding of the electronic part of the passive radiofrequency transponder 1, is in this case formed by a first primary cover filament helically wound around a main core. The first primary cover filament comprises the conductive filamentary elements, two of which form the half-wave dipole antenna, and at least one electronic chip connected to its terminals by the conductive filamentary elements. In this example, a closed loop is created by means of a third conductive filamentary element and a connection chip according to the principle presented in FIG. 2. The length L of the helical winding 1010 of the first primary cover filament, corresponding to the electronic part of the passive radiofrequency transponder 1, is around 60 millimetres, between 30 and 80 millimetres. The helix is formed around a main core with an outside diameter of 0.5 millimetre, with a helix pitch of around 1 millimetre. This helix geometry makes it possible to match the impedance of the half-wave dipole antenna to that of the electronic chip equipped with its closed loop. The sub-assembly 1010 is positioned in the center of the electrical insulation device owing to the dielectric homogeneity of the electrical insulation device. In this example, the helical winding 1010 of the electronic part of the passive radiofrequency transponder 1 is covered with an adhesion promoter 1020. This adhesion promoter 1020 guarantees better cohesion between the outer cover filament of the helical winding 1010 of the electronic part of the passive radiofrequency transponder 1, which here is a first primary cover filament, and the elastomer compounds adjacent to this outer cover filament.

The electrical insulation device here consists of two bodies 2001 and 2002 in an elastomer compound the relative dielectric permittivity of which is less than 5. The thickness of the electrical insulation device radially outside the outer cover filament with respect to the main longitudinal axis 1030 is 3 millimetres, well above one-sixth of the winding diameter, here around 1 to 2 millimetres, of the helical winding of the electronic part of the passive radiofrequency transponder 1. This ensures a region of electrical insulation around the half-wave dipole antenna which is sufficient for good radiofrequency communication efficiency.

Figure 6:
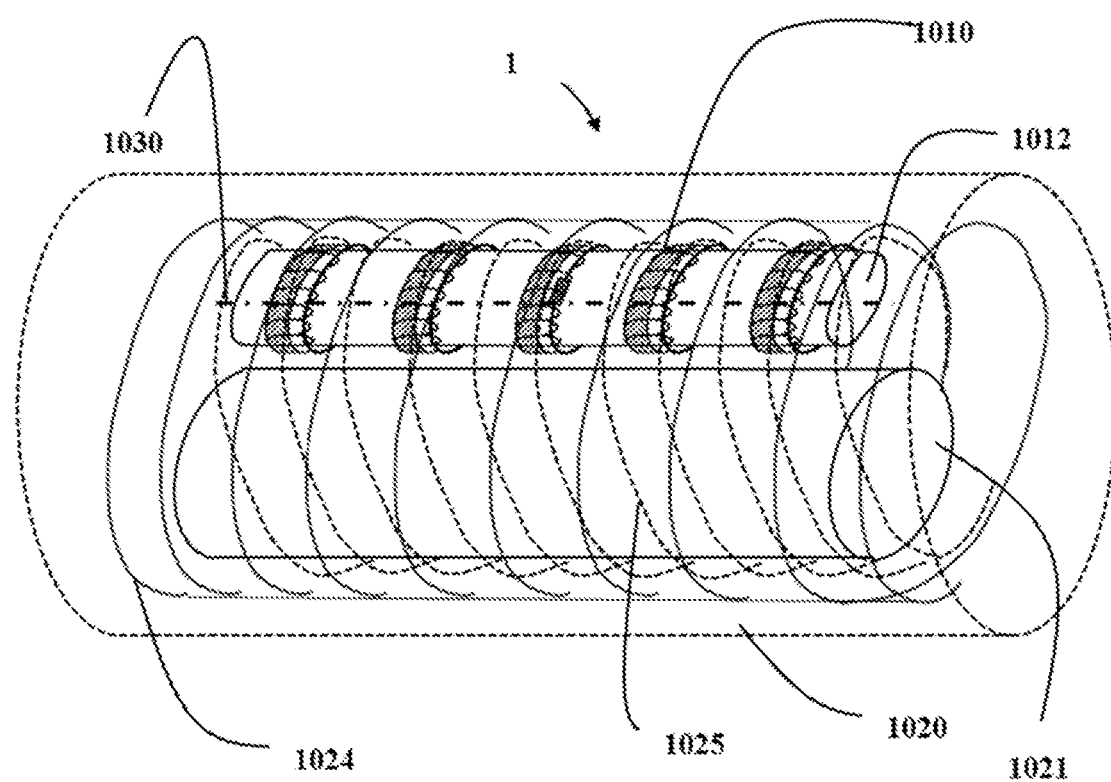
FIG. 6 is a perspective view of a passive radiofrequency transponder in a second embodiment of the electrical insulation device according to the invention.

FIG. 6 is a partially schematic perspective view of the passive radiofrequency transponder 1 according to another embodiment in which the electrical insulation device consists of textile secondary cover filaments 1024 and 1025.

The passive radiofrequency transponder 1 here consists of a helical winding 1010 of the electronic part around a main core 1012 defining a first longitudinal axis 1030. This helical winding 1010 is produced by a single primary cover filament comprising a tertiary core collinearly arranged with respect to the two conductive filamentary elements defining the half-wave dipole antenna, one end of which is connected to an electronic chip. The electrical insulation device here consists of a secondary core 1021 arranged collinearly with the helical winding 1010 of the electronic part of the passive radiofrequency transponder 1. This secondary core 1021 is in this case solid and electrically insulating with a dielectric permittivity of less than 10. It consists of a polyacrylate multi-filament wire. In another variant, the secondary core 1002 could be hollow in order to make it possible to receive inside its tubular orifice the helical winding 1010 of the electronic part. Here, it is arranged parallel to the main longitudinal axis 1030. This therefore requires the presence of a secondary cover filament helically wound around the sub-assembly 1010 and the secondary core 1021 which will make the two components integral with one another, thus guaranteeing the rectilinear geometry of the helical winding 1010 of the electronic part. This first secondary cover filament 1024 is shown schematically by the solid line representing its neutral fibre. In order to balance the stresses, a second secondary cover filament 1025 is wound around the two components in the opposite direction. Doubling the secondary cover filaments guarantees better cohesion of the whole assembly. It also ensures a certain homogeneous thickness of electrical insulation around the electronic part of the radiofrequency transponder 1, much greater than one-sixth of the winding diameter D of the helical winding 1010 of the electronic part. In fact, a thickness of 3 to 4 millimetres of electrical insulation constitutes the threshold thickness after which increasing the thickness no longer affords any gain in radioelectric performance of the passive radiofrequency transponder. This threshold thickness may be obtained by a single large-diameter secondary cover filament, a multitude of winding turns of the same smaller-diameter filament or a combination of several secondary cover filaments of intermediate diameter as in this case.

Lastly, with the secondary cover filaments 1024 and 1025 being generally made of textile, such as polyacrylate for example, and being arranged radially outermost with respect to the main longitudinal axis 1030, they constitute the outer cover filaments especially if these filaments are not touching. They should thus be covered with an adhesion promoter 1020 in order to guarantee cohesion between the outer cover filaments and the elastomer compounds adjacent to these outer cover filaments. In this case, the adjacent elastomer compounds are layers of the tyre.

The circumferential direction of the tyre, or longitudinal direction, is the direction that corresponds to the periphery of the tyre and is defined by the direction of running of the tyre casing.

The transverse or axial direction of the tyre is parallel to the axis of rotation, or reference axis, of the tyre casing.

The radial direction is a direction which crosses the reference axis of the tyre casing and is perpendicular thereto.

The axis of rotation or reference axis of the tyre casing is the axis about which it turns in normal use.

A radial or meridian plane is a plane that contains the reference axis of revolution of the tyre.

The circumferential median plane, or equatorial plane, is a plane that is perpendicular to the reference axis of the tyre casing and divides the latter into two halves.

Figure 7:
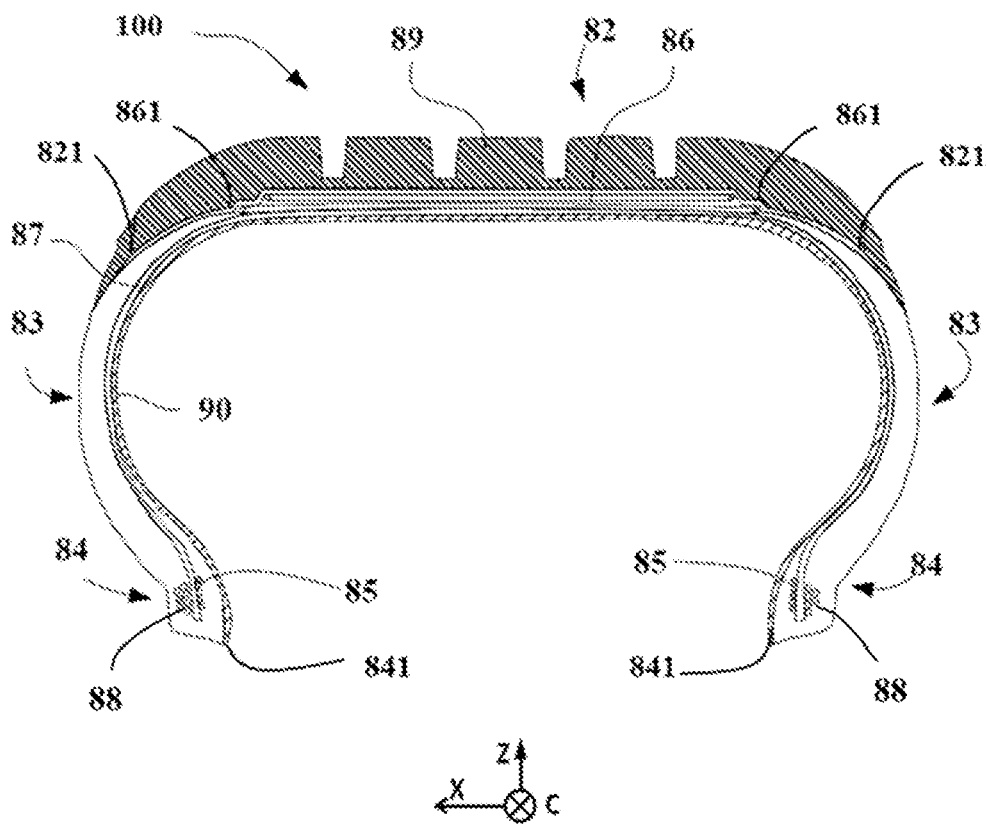
FIG. 7 shows a view in meridian section of a tyre casing of the prior art.

FIG. 7 shows a meridian section of a tyre casing 100 including a crown 82 reinforced by a crown reinforcement or belt 86, two sidewalls 83 and two beads 84. The crown 82 is delimited axially by two axial ends 821 providing the connection with each sidewall 83 of the tyre casing 100. The crown reinforcement 86 extends axially as far as an axial end 861 at each of its edges. The crown reinforcement 86 is surmounted radially on the outside by a tread 89 made of an elastomeric material. A carcass reinforcement 87 anchored in the beads 84 separates the tyre casing into two regions, which will be called the inner region in the direction of the fluid cavity and the outer region towards the outside of the mounted assembly. Each of these beads 84 is reinforced by a first spiral 85 located in the inner region of the tyre casing and, in this example, by a second spiral 88 located in the outer region of the tyre casing. The bead 84 has a radially and axially inner end 841. The carcass reinforcement 87 comprises reinforcing filaments going back and forth between the ends of the carcass, said ends being sandwiched between the two spirals 85 and 88 in each bead 84. The carcass reinforcement 87, in a manner known per se, consists of textile filaments. The carcass reinforcement 87 extends from one bead 84 to the other so as to form an angle of between 80° and 90° with the circumferential median plane EP. An airtight inner liner 90 extends from one bead 84 to the other, internally with respect to the carcass reinforcement 87.

Figure 8:
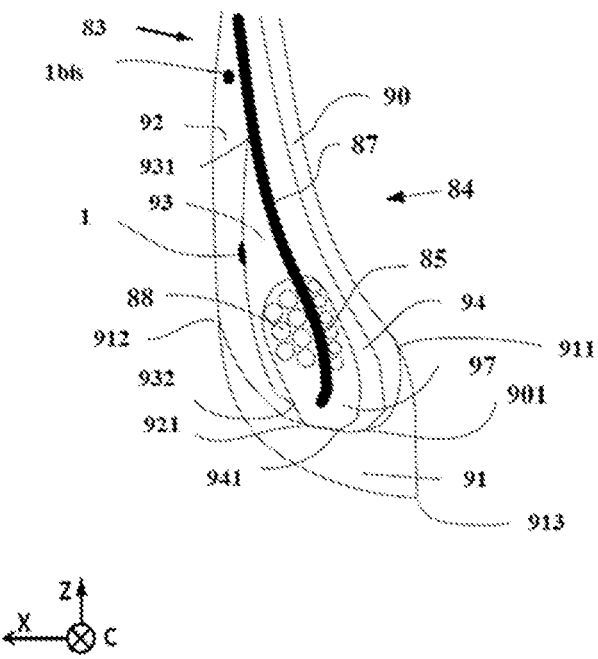
FIG. 8 shows a view in meridian section of the bead and the sidewall of a tyre casing according to the invention when the passive radiofrequency transponder is located in the outer region of the tyre casing.

FIG. 8 shows a detailed view of the tyre casing 100 in the region of the bead 84 and the sidewall 83. This figure illustrates the position of the passive radiofrequency transponder 1 in the outer region of the tyre casing 100 with respect to the carcass reinforcement 87.

The bead 84 consists of the spirals 85 and 88 located respectively in the inner and outer region of the tyre casing, sandwiching the ends of the carcass reinforcement 87, the whole being coated in a layer of elastomer compound 97. A first layer of rubber compound 91, referred to as the bead protector, is located radially inside the spirals 85 and 88. It has a radially and axially outer free edge 912. It also has two free edges 911 and 913 axially inside the carcass reinforcement 87. The radially innermost free edge 913 here constitutes the inner end of the bead 84. A second layer of elastomer compound 92 situated radially outside the first layer of elastomer compound 91 defines the exterior surface of the sidewall 83. A third layer of rubber compound 93, referred to as the reinforcement filler, is adjacent to the second layer of elastomer compound 92. It has two free edges. The first free edge 932 is situated radially internally and bears on the layer of elastomer compound 97. The other free edge 931 is situated radially externally and ends on the face of the carcass reinforcement 87.

The airtight inner liner 90, which is axially inside the carcass reinforcement 87 in this configuration, is located on the inner region of the tyre casing 100. It ends with a free edge 901 adjacent to the layer of elastomer compound 97. Lastly, a fourth layer of elastomer compound 94 protects the carcass reinforcement.

The bead 84 and the sidewall 83 of this tyre casing 100 are equipped with passive radiofrequency transponders, numbered 1, possibly with suffixes, which are situated in the outer region of the tyre casing 100. The first passive radiofrequency transponder 1 is positioned on the outer face of the third layer of elastomer compound 93. It is positioned at a distance of 10 millimetres from the radially outer free edge of the spiral 88 that constitutes a mechanical singularity. This position ensures an area of mechanical stability for the radiofrequency transponder 1 that is beneficial to the mechanical endurance thereof. In addition, embedding it within the very structure of the tyre casing 100 gives it good protection against mechanical attacks coming from outside the tyre casing 100.

The second radiofrequency transponder 1*bis* is positioned inside the second layer of elastomer compound 92. The radiofrequency transponder 1*bis* is simply placed within the material during injection moulding in the green state of the second layer of elastomer compound 92 during the building of the tyre casing 100.

It is preferable that the outer cover filament of the passive radiofrequency transponder be coated with an adhesion promoter that promotes adhesion with the adjacent elastomer compound layers. In particular in the case of the second embodiment of the electrical insulation device, its presence is essential to ensure cohesion with the second layer of elastomer compound 92. Pressurizing the green tyre body in the curing mould ensures that the radiofrequency transponder 1*bis* is, in the cured state, positioned as shown. This radiofrequency transponder 1*bis* is situated far from any free edge of another component of the tyre casing 100. In particular, it is at a distance from the free edge 931 of the third layer of elastomer compound 93, from the radially outer free edge of the spiral 88 and from the free edges 912 of the bead protector 91. Its position ensures better performance in terms of communication with an external radiofrequency reader because it is at a distance from the metal components of the mounted assembly. Cyclic stress loadings during running will not be disruptive owing to the miniaturization of the electronic part of the passive radiofrequency transponder 1*bis*. Of necessity, these two transponders are situated axially on the outside of the end 913 of the first layer of rubber compound 91 and therefore of the inner end of the bead 84. They are positioned radially between the radially outer end of the spiral 88 with respect to the reference axis of the tyre casing 100, and the axial ends 861 of the crown reinforcement 86.

Moreover, it is also necessary to ensure that the thickness of the elastomer compound between the outer cover filament of the passive radiofrequency transponder 1*bis* and the first filaments of the carcass reinforcement is greater than 0.5 millimetre or even 1 millimetre to prevent any friction between these two types of filaments which can cause them to deteriorate under cyclic stress loadings during the use of the tyre casing 100. This thus guarantees the physical integrity of the radiofrequency transponder 1*bis* and/or that of the tyre casing 100.

Figure 9:
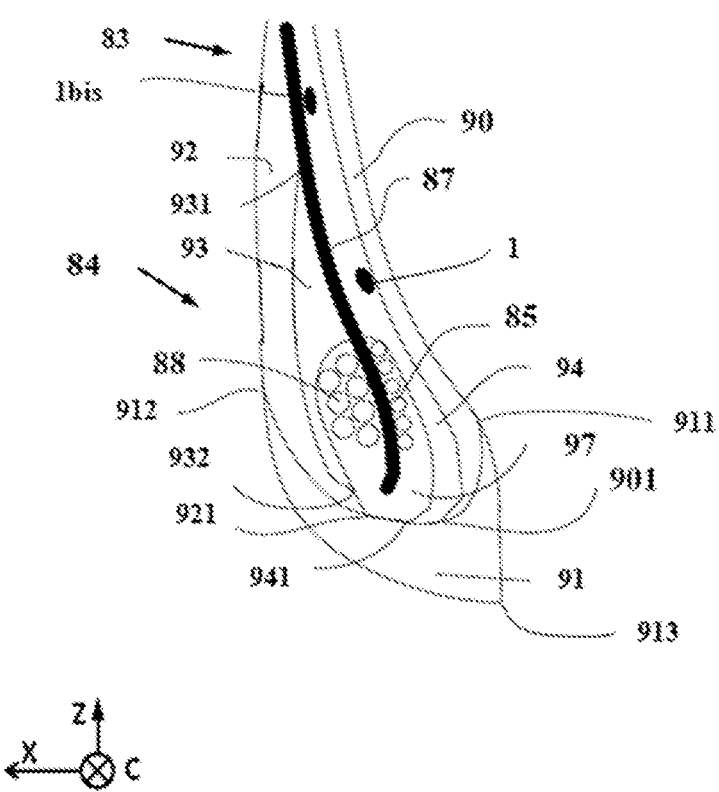
FIG. 9 shows a view in meridian section of the bead and the sidewall of a tyre casing according to the invention when the passive radiofrequency transponder is located in the inner region of the tyre casing.

FIG. 9 shows a detailed meridian section of a tyre casing 100 in the region of the bead 84 and of the sidewall 83. This FIG. 9 illustrates the position of the passive radiofrequency transponder in the inner region of the tyre casing 100 with respect to the main part of the carcass reinforcement 87.

The tyre casing 100 comprises, in particular in the inner region, an airtight inner liner 90 and a layer of elastomer compound 94 interposed between the carcass reinforcement 87 and the airtight inner liner 90. This layer of elastomer compound 94 has a radially inner free edge 941 located underneath the spiral 85. This layer of elastomer compound 94 extends from one bead 84 to the other bead 84 of the tyre casing 100.

The location of the radiofrequency transponder 1*bis* in the region of the first filaments forming the carcass reinforcement 87 allows the radiofrequency transponder 1 to be mechanically stabilized. This transponder is radially outside the free edge 913 of the bead protector 91 by more than 40 millimetres, which allows it to be positioned radially outside the rim flange when the tyre casing is in service mounted on a wheel. By contrast, in order to ensure suitable radiocommunication performance, it is preferable to use an encapsulating rubber that is electrically insulating for encapsulating the radiofrequency transponder 1*bis*. From the viewpoint of radiocommunication performance, this position allows improved radiocommunication performance by being radially further outwards in the tyre casing 100. Its orientation is in any case such that it rests on at least two first filaments of the carcass reinforcement 87. This ensures that the radiofrequency transponder 1*bis* is in an axial position, with respect to the thickness of the tyre casing 100, that allows robust tuning of the resonance of the radiating antenna of the passive radiofrequency transponder 1*bis* when this transponder is incorporated in the tyre casing 100. Lastly, the outer cover filaments of the passive radiofrequency transponder 1 must be at a distance from the various filaments of the layers of the tyre casing 100 by at least 0.5 millimetre in order to limit the friction between these two types of filaments under cyclic stress loadings during the use of the tyre casing 100. This guarantees both the physical integrity of the passive radiofrequency transponder 1*bis* and/or that of the tyre casing 100.

The second location of the radiofrequency transponder 1 according to the invention is ideal for the passive radiofrequency transponder 1, which is protected from any external mechanical attack and from any internal thermo-mechanical attack. However, it is advisable for the first longitudinal axis of the radiating antenna to be positioned in such a way that the radiofrequency transponder 1 rests on at least two first filaments of the carcass reinforcement 87. Here, in this example, the first longitudinal axis is placed circumferentially. It is preferable for the passive radiofrequency transponder 1 to be positioned on the inside of a layer of elastomer compound of the tyre casing 100. That means that the data contained in the electronic chip of the passive radiofrequency transponder cannot be falsified when this chip has been write-protected after the first writing to the memory associated with the electronic chip. Moreover, the homogeneity surrounding the radiofrequency transponder 1 provides the tyre casing 100 and the passive radiofrequency transponder 1 with better physical integrity.

Figure 10:
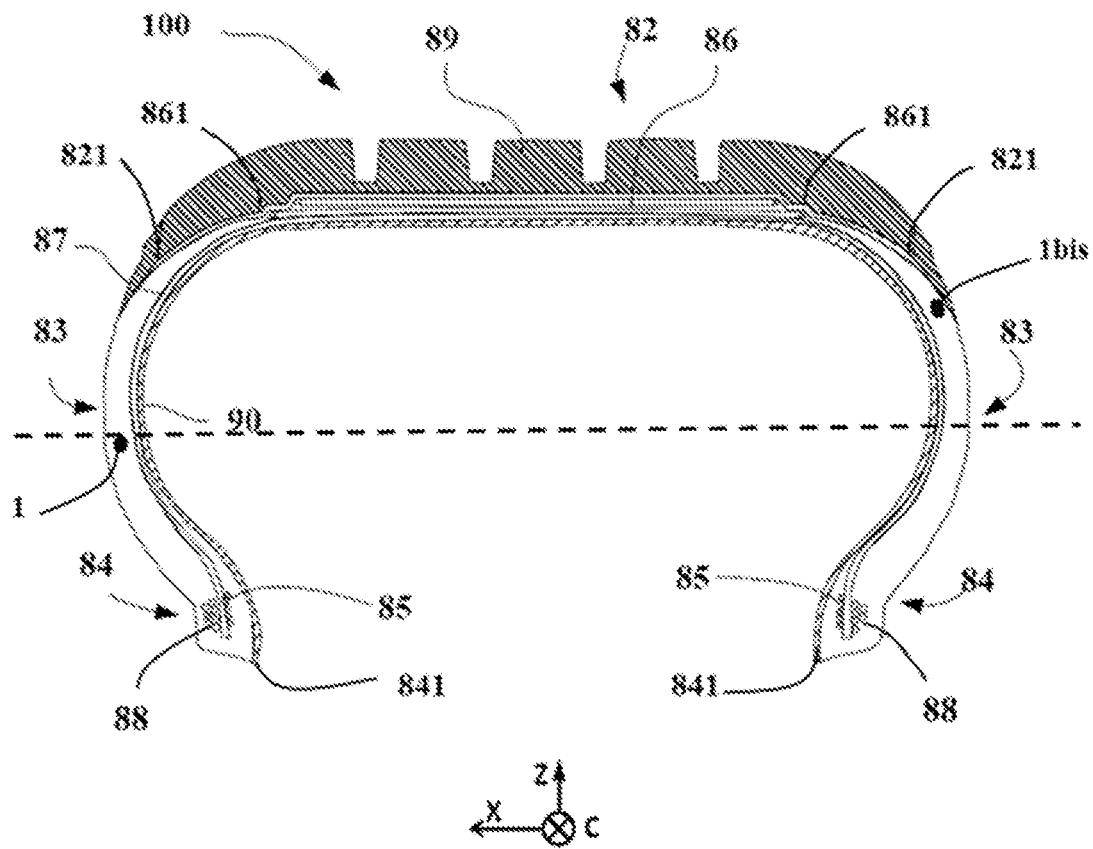
FIG. 10 shows a view in meridian section of a tyre casing comprising passive radiofrequency transponders in the upper part of the sidewall.

FIG. 10 shows a view in meridian section of a tyre casing 100 corresponding to the fitting of the radiofrequency transponder 1 on the sidewall 83 of the tyre casing 100. In this example, the radiofrequency transponder 1 is fitted substantially half way up the height of the sidewall 83 of the tyre casing 100, symbolized by the dashed line. This is an ideal area in terms of radiocommunication, since it is first of all at a distance from the strong metal areas of the tyre while guaranteeing a free space on the outside of the tyre. Furthermore, the surrounding rubbers are flexible rubbers generally subjected to little load, which is favorable to good radiofrequency operation of the radiofrequency transponder 1, especially if the thickness of the electrical insulation device of the radiofrequency transponder is below its threshold value. With regard to the physical integrity of the passive radiofrequency transponder 1, even though this geometric area is subjected to considerable cyclic stress loadings in particular when passing into the contact area, the miniaturization of the electronic part allows a satisfactory lifetime of the passive radiofrequency transponder 1. With regard to the physical integrity of the tyre casing 100, the radiofrequency transponder 1 should be placed sufficiently far from the free edges, which are in this case located in the outer region of the tyre casing 100. Bearing on the carcass reinforcement 87, the first longitudinal axis of the passive radiofrequency transponder 1 should be positioned such that its projection on the carcass reinforcement 87 intercepts at least two first filaments of the carcass reinforcement 87. Ideally, the first longitudinal axis of the radiating dipole antenna is perpendicular to the filaments of the carcass reinforcement 87, which amounts to positioning it circumferentially in the case of a tyre casing 100 with a radial structure. Ideally, the outer cover filament of the passive radiofrequency transponder 1 is not in contact with the first filaments of the carcass reinforcement 87 so as to limit any friction between the two types of filaments. This guarantees both the physical integrity of the radiofrequency transponder 1 and that of the tyre casing 100.

The second position in the region of the sidewall 83 amounts to positioning the radiofrequency transponder 1bis inside the layer of rubber compound defining the sidewall 83 and radially close to the axial end 821 of the crown block 82. The advantage of this position is the homogeneity of the material around the passive radiofrequency transponder 1b is which improves the radiocommunication performance of the radiating antenna except in the case of an electrical insulation device with a thickness greater than or equal to the threshold thickness. In order to meet the requirements relating to the integrity of the tyre casing 100, the radiofrequency transponder 1bis should be at a distance from any free edge 861 of the crown reinforcement 86 or ends of a rubber body situated in the outer region of the tyre casing 100. Care will be taken in particular to place the radiofrequency transponder 1bis at a distance of at least 5 millimetres from the free edge 861 of the crown reinforcement 86 and from the end 821 of the crown block 82. Naturally, the physical integrity of the radiofrequency transponder 1bis will be all the more ensured the further the radial position thereof is from the equator, corresponding to the axial ends of the tyre, which are areas frequently subject to impacts with road equipment, such as pavement edges. Other positions, not illustrated in the drawings, are possible in particular in the inner region of the tyre casing 100 with respect to the carcass reinforcement 87. The inner region of the tyre casing constitutes a natural protective area for the passive radiofrequency transponder which is beneficial to the physical integrity thereof, at the expense of slightly reduced radiocommunication performance. This inner region also has the advantage of limiting the number of free edges of components of the tyre casing that are potentially weak points with respect to the mechanical endurance of the tyre casing equipped with the passive radiofrequency transponder.

Naturally, the radiating dipole antenna of the passive radiofrequency transponder 1 and 1bis can have any orientation with respect to the direction defined by the first filaments of the carcass reinforcement, provided that the projection of the radiating dipole antenna intercepts at least two first filaments of the carcass reinforcement. As a result, what is meant by the distance between the end of a layer and the passive radiofrequency transponder is the distance of each material point of the passive radiofrequency transponder in each meridian plane of the tyre casing with respect to the end of the layer in that same meridian plane. However, it is more practical to position the passive radiofrequency transponder directly so that the first longitudinal axis is substantially perpendicular to the direction of the first filaments of the carcass reinforcement.

Naturally, if filaments of the tyre casing, such as those of the carcass reinforcement layer 87, and potentially the reinforcing elements of the reinforcing layers, are metal in nature, it is necessary to guarantee an angle of at least 30 degrees, and preferably of at least 45 degrees between the first longitudinal axis of the passive radiofrequency transponder and the direction of reinforcement defined by its reinforcing elements. In this way, disruption to the radiocommunication of the radiofrequency transponder is minimized. Ideally, in a tyre casing for a radial tyre with a single metal carcass reinforcement layer, the angle between the first longitudinal axis of the radiofrequency transponder and the direction of reinforcement of the reinforcing layer is 90 degrees.

The invention claimed is:

1. A tire casing (100) in a shape of a torus about a reference axis, equipped with a passive radiofrequency transponder (1, 1bis) and comprising:
 a crown block (82) comprising a crown reinforcement (86) having an axial end (861) at each of its edges, and a tread (89), connected at each of its axial ends (821) to a bead (84) having an inner end (841) situated axially and radially on an inside of the bead (84) with respect to the reference axis, via a sidewall (83);
 first filaments going back and forth, in an adjacent arrangement and aligned circumferentially, anchored in the beads (84) with, in each bead (84), loops each connecting back and forth filaments, the first filaments forming at least a circumferential alignment defining a carcass reinforcement (87) separating the tire casing into two regions, inner and outer, with respect to the carcass reinforcement (87);
 in each bead (84), means for anchoring the first filaments, comprising second filaments oriented circumferentially axially bordering the first filaments, and forming at least one spiral (85, 88);
 a first layer of elastomer compound (91) forming an exterior surface of the tire casing (100) in a region of the bead (84), the first layer of elastomer compound (91) being intended to come into contact with a rim;
 a second layer of elastomer compound (92) situated radially on an outside in contact with the first layer of elastomer compound (91) forming an exterior surface of the sidewall (83); and the passive radiofrequency transponder (1, 1bis), comprising a main core (1012) defining a first longitudinal axis (1030), a first primary cover filament (1013a) wound in turns around the main core (1012) defining a winding diameter D and an electrical insulation device (1021, 1024, 1025, 2001, 2002), disposed radially on an outside of the first primary cover filament (1013a) with respect to the first longitudinal axis (1030), the first primary cover filament (1013a) comprising at least two conductive filamentary elements (1003a, 1003b), the diameter of which is between 0.05 and 0.15 millimeter, galvanically connected to at least one electronic chip (1002) comprising a radiofrequency transmission-reception component (1004), and the main core (1012) having a stiffness lower than a maximum stiffness of the first primary cover wire (1013a, 1013b), wherein the electrical insulation device (1021, 1024, 1025, 2001, 2002) has a mean relative dielectric permittivity less than or equal to 10 over a thickness greater than or equal to one-sixth of the winding diameter D of the first primary cover filament (1013a), wherein a dipole radiating antenna (10) is located in line with at least two first filaments of the carcass reinforcement (87), wherein the passive radiofrequency transponder (1, 1bis) is located axially on an outside of the inner end (841) of the bead (84) and radially between a radially outermost end (851) of the at least one spiral (85) and the axial end (861) of the crown reinforcement (86), and wherein a thickness of elastomer compound separating the outer cover filament (1013a, 1013b, 1024, 1025) of the passive radiofrequency transponder (1, 1bis), located radially outermost with respect to the first longitudinal axis (1030), and the reinforcing elements is greater than 0.5 millimeter.

2. The tire casing according to claim 1, wherein the outer cover filament (1013a, 1013b, 1024, 1025) of the passive radiofrequency transponder (1, 1bis) is covered with an adhesion promoter (1020) promoting adhesion between the outer cover filament (1013a, 1013b, 1024, 1025) and the elastomer compounds adjacent to the outer cover filament (1013a, 1013b, 1024, 1025).

3. The tire casing according to claim 1, wherein the tire casing (100) further comprises at least a third layer of elastomer compound (93) situated axially on an outside of the carcass reinforcement (87) and axially on an inside of the first (91) and/or second (92) layer of elastomer compound.

4. The tire casing according to claim 1, wherein, with the tire casing (100) further comprising at least one airtight layer of elastomer compound (90) located furthest on an inside of the tire casing (100), the tire casing (100) further comprises at least a fourth layer of elastomer compound (94) axially on an inside of the carcass reinforcement (87).

5. The tire casing according to claim 1, wherein the tire casing (100) further comprises at least third reinforcing filaments in an adjacent arrangement so as to constitute a reinforcing structure (89).

6. The tire casing according to claim 1, wherein with the orientation of the first filaments defining a direction of reinforcement, the first longitudinal axis (1030) of the radiofrequency transponder (1, 1bis) is perpendicular to the direction of reinforcement.

7. The tire casing according to claim 1, wherein the passive radiofrequency transponder (1, 1bis) is situated in contact with a layer of elastomer compound (90, 91, 92, 93, 94) of the tire casing (100).

8. The tire casing according to claim 7, wherein the passive radiofrequency transponder (1, 1bis) is situated at a distance of at least 5 millimeters from the ends (851, 861) of a reinforcing structure (85, 86, 88, 89) of the tire casing.

9. The tire casing according to claim 1, wherein, with the first primary cover filament (1013a) comprising a non-extensible tertiary core (1014), arranged collinearly with the at least two conductive filamentary elements (1003a, 1003b) and with the at least one electronic chip (1002), and at least one tertiary cover filament (1015) wound in turns around the tertiary core (1014), the at least two conductive filamentary elements (1003a, 1003b) and the at least one electronic chip (1002), the tertiary core (1014) has a stiffness greater than a maximum stiffness of each conductive filamentary element (1003a, 1003b).

10. The tire casing according to claim 1, wherein, with one of the conductive filamentary elements (1003a, 1003b) being galvanically connected to an end of a third conductive filamentary element (1003c), the other end of which end is galvanically connected to the at least one electronic chip (1002) in order to form a closed loop, parts of the conductive filamentary elements (1003a, 1003b, 1003c) forming the loop and the at least one electronic chip (1002) are electrically insulated.

11. The tire casing according to claim 1, wherein the electrical insulation device of the passive radiofrequency transponder comprises at least one secondary cover filament (1024, 1025) wound in turns around a secondary core (1021), the main core (1012) and the first primary cover filament (1013a), the secondary core (1021) being collinear with the main core (1012).

12. The tire casing according to claim 1, wherein a length L of the helical winding of the first primary cover filament (1013a) of the passive radiofrequency transponder (1, 1bis) along the first main axis (1030) is between 30 and 80 millimeters.

13. The tire casing according to claim 1, wherein a diameter of the conductive filamentary elements (1003a, 1003b, 1003c) is between 0.08 and 0.11 millimeter.

* * * * *